No. 772,122. PATENTED OCT. 11, 1904.
J. ANDERSON.
AUTOMATIC POULTRY FEEDER.
APPLICATION FILED JUNE 15, 1903.
NO MODEL. 2 SHEETS—SHEET 1.

WITNESSES
George W. Goodspeed
John S. Lynch

INVENTOR
John Anderson
BY S. Scholfield ATTY.

No. 772,122. PATENTED OCT. 11, 1904.
J. ANDERSON.
AUTOMATIC POULTRY FEEDER.
APPLICATION FILED JUNE 15, 1903.
NO MODEL. 2 SHEETS—SHEET 2.

WITNESSES
INVENTOR
John Anderson,
BY S. Scholfield
ATTY.

No. 772,122. Patented October 11, 1904.

UNITED STATES PATENT OFFICE.

JOHN ANDERSON, OF SLOCUMVILLE, RHODE ISLAND.

AUTOMATIC POULTRY-FEEDER.

SPECIFICATION forming part of Letters Patent No. 772,122, dated October 11, 1904.

Application filed June 15, 1903. Serial No. 161,603. (No model.)

*To all whom it may concern:*

Be it known that I, JOHN ANDERSON, a subject of the King of Great Britain, residing at Slocumville, in the county of Washington and State of Rhode Island, have invented a new and useful Improvement in Automatic Poultry-Feeders, of which the following is a specification.

My invention consists in the improved arrangement of a hopper, with a delivering-valve, and feed-pan, with means for counterbalancing the feed-pan, as hereinafter set forth.

Figure 2:
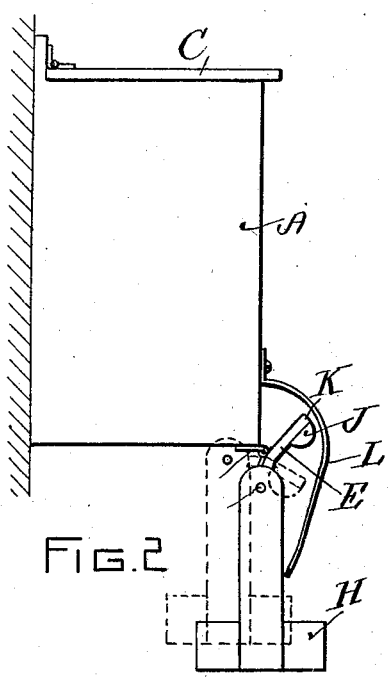
Figure 1:
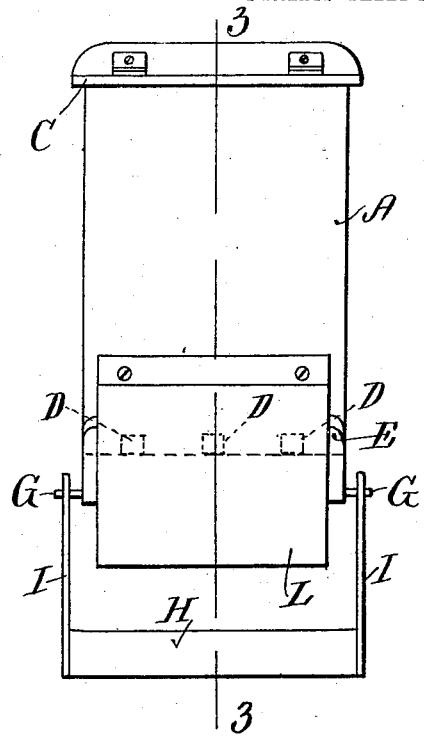
Figure 3:
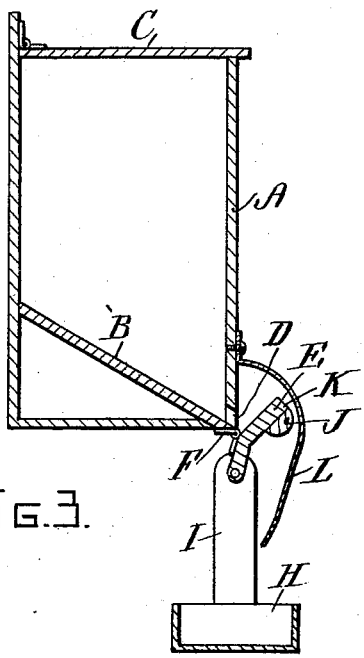
Figure 5:
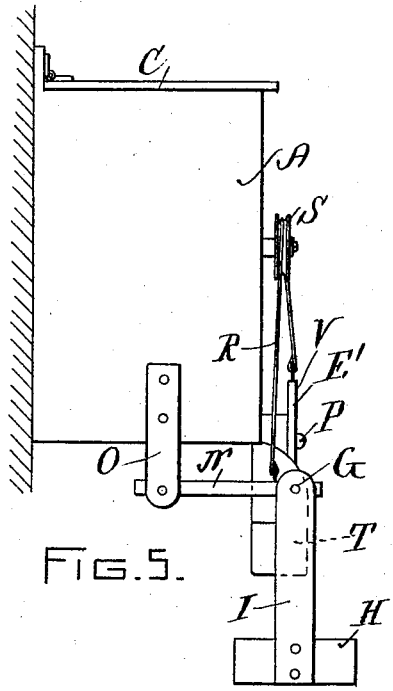
Figure 4:
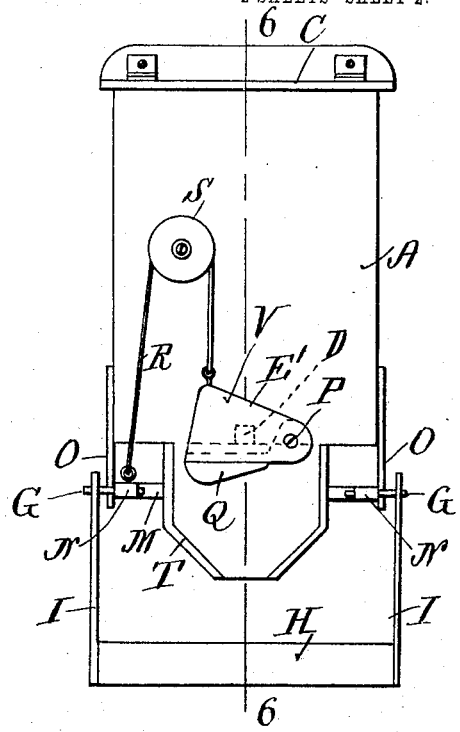
Figure 6:
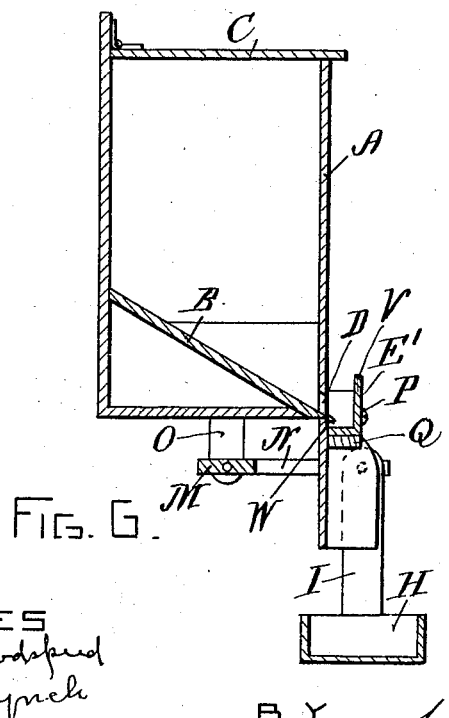

In the accompanying drawings, Figure 1 represents a front elevation of an automatic poultry-feeder embodying my invention. Fig. 2 represents a side view of the same. Fig. 3 represents a section taken in the line 3 3 of Fig. 1. Fig. 4 represents a front view showing a modification. Fig. 5 represents a side view of the same. Fig. 6 represents a section taken in the line 6 6 of Fig. 4.

In the drawings Figs. 1, 2, and 3, A represents the hopper, provided with the downwardly-inclined bottom B and the hinged cover C. The delivery of the grain from the several openings D of the hopper is controlled by means of the pivoted or hinged valve E, which when in its upwardly-inclined position, as shown in Figs. 1 and 3, serves to prevent the grain from passing out of the openings D of the hopper. As shown in the drawings, the valve E, which extends from side to side of the hopper A, is connected to the hopper by means of hinges F and is provided at its ends with the projecting studs G G, upon which is hung the removable feed-pan H by means of the upright arms I I, which are secured to the opposite ends of the feed-pan, the said arms being adapted to be slipped on and off of the studs G G of the valve E. The outer edge K of the hinged valve is provided with the attached bar-weight J, which serves to overbalance the feed-pan when the grain therein has been consumed, thus causing the outer edge of the valve E to fall to the delivering position, (shown by the dotted lines in Fig. 2,) in which position the grain will be allowed to pass freely to the feed-pan H, and when the said feed-pan has been properly filled the weight of the grain will overbalance the attached bar-weight J and cause the valve E to be raised to shut off the flow of grain from the hopper until the charge of grain in the feed-pan has been consumed, and this operation will be automatically repeated as often as the grain in the feed-pan is consumed by the poultry. The curved guide-plate L is attached to the front of the hopper to properly guide the grain into the feed-pan H after it passes over the outer edge K of the valve.

A modification of my invention is shown in Figs. 4, 5, and 6, in which the valve E' instead of being pivoted or hinged to swing toward and from the front of the hopper is pivoted to swing along the side of the front of the hopper, and in this case the rock-shaft M, provided with the forwardly-projecting arms N N, is journaled in the brackets O O, located at each side of the hopper, the outer ends of the said arms N N being provided with the projecting studs G G, upon which is hung the removable feed-pan H, as before described. The valve E' is pivoted to the front side of the hopper A at the point P and provided at its under side with the attached weight Q, and connection is made from the arm N of the rock-shaft M to the pivoted valve E' by means of the cord R, which passes over the pulley S. The front of the hopper A is extended downward to form a deflecting-guide T for directing the grain into the feed-pan H upon its escape from the valve E', and in this case when the valve E' is in its raised position, as shown in Figs. 4 and 6, the grain will be prevented from flowing out of the opening D of the hopper by the resulting accumulation of grain in the horizontally-held valve, and when the grain in the feed-pan has been consumed the feed-pan will be overbalanced by the weighted valve E', so that the outer end of the valve will fall and allow the grain to pass from the opening D of the hopper into the feed-pan H, being deflected thereto by the deflecting-guide T, and upon the accumulation of the required quantity of grain in the feed-pan the valve E' will be overbalanced, and thus caused to rise to cut off the flow of grain as before. The upwardly-extending side V of the valve serves to prevent the escape of the grain from the outer side of the valve, and the projecting lip W at the lower side of the opening D serves to guide the grain away from the inner edge of the valve, and thus prevent obstruction to its pivotal movement.

I claim as my invention—

In a poultry-feeder, the combination of the hopper, the delivering-valve hinged or pivoted to the hopper, the pendent feed-pan connected with the delivering-valve, a deflecting-guide for guiding the grain in its passage from the valve to the feed-pan, and means for overbalancing the weight of the feed-pan, and causing the downward inclination of the delivering-valve, substantially as described.

JOHN ANDERSON.

Witnesses:
SOCRATES SCHOLFIELD,
FRANK D. JENKS.